Feb. 23, 1954 P. F. BELL 2,669,860
HOLLOW PLASTER BUILDING PANELS AND METHOD OF MAKING
Filed Jan. 10, 1946 10 Sheets-Sheet 1
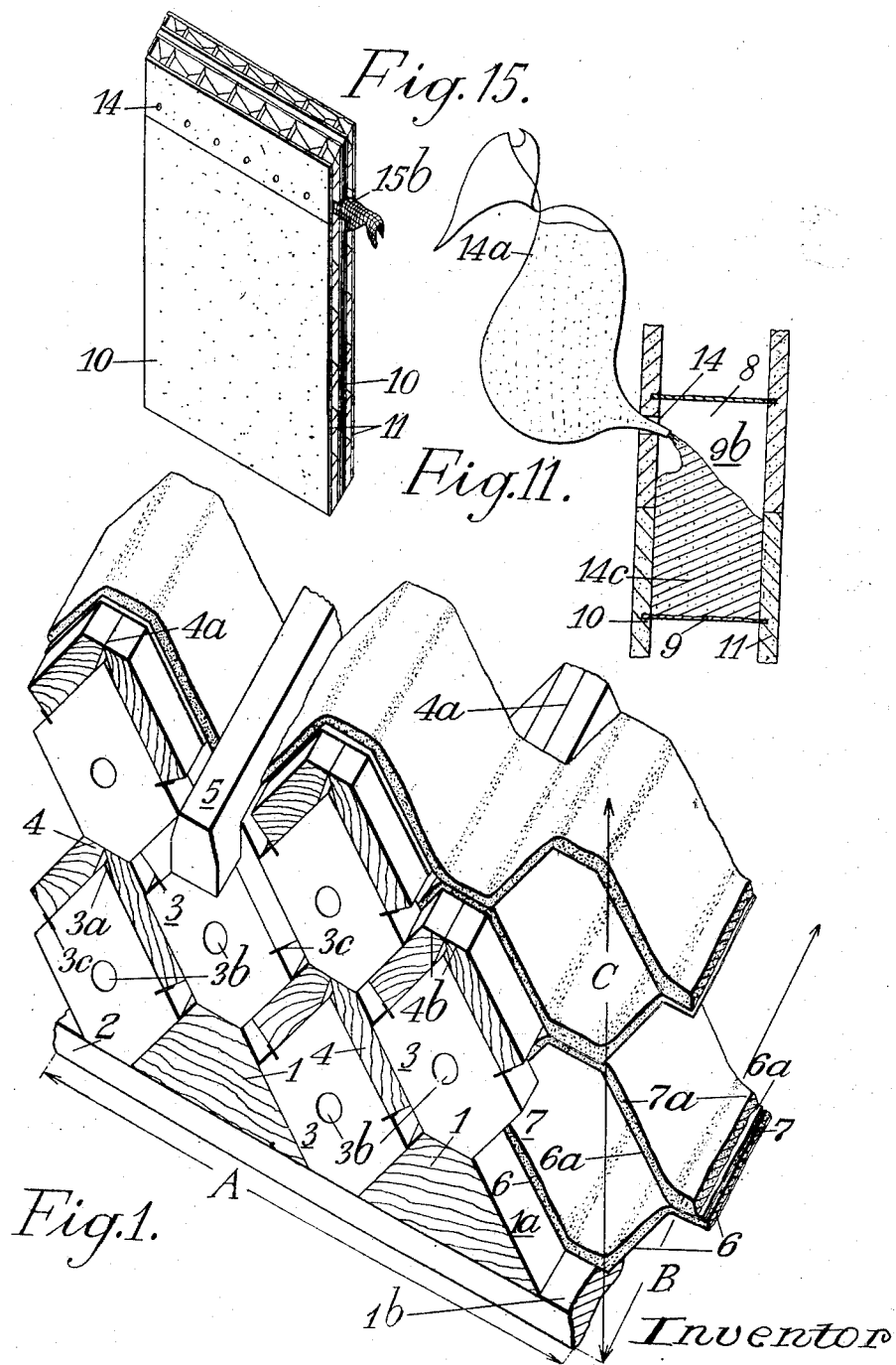
Inventor
P. F. Bell

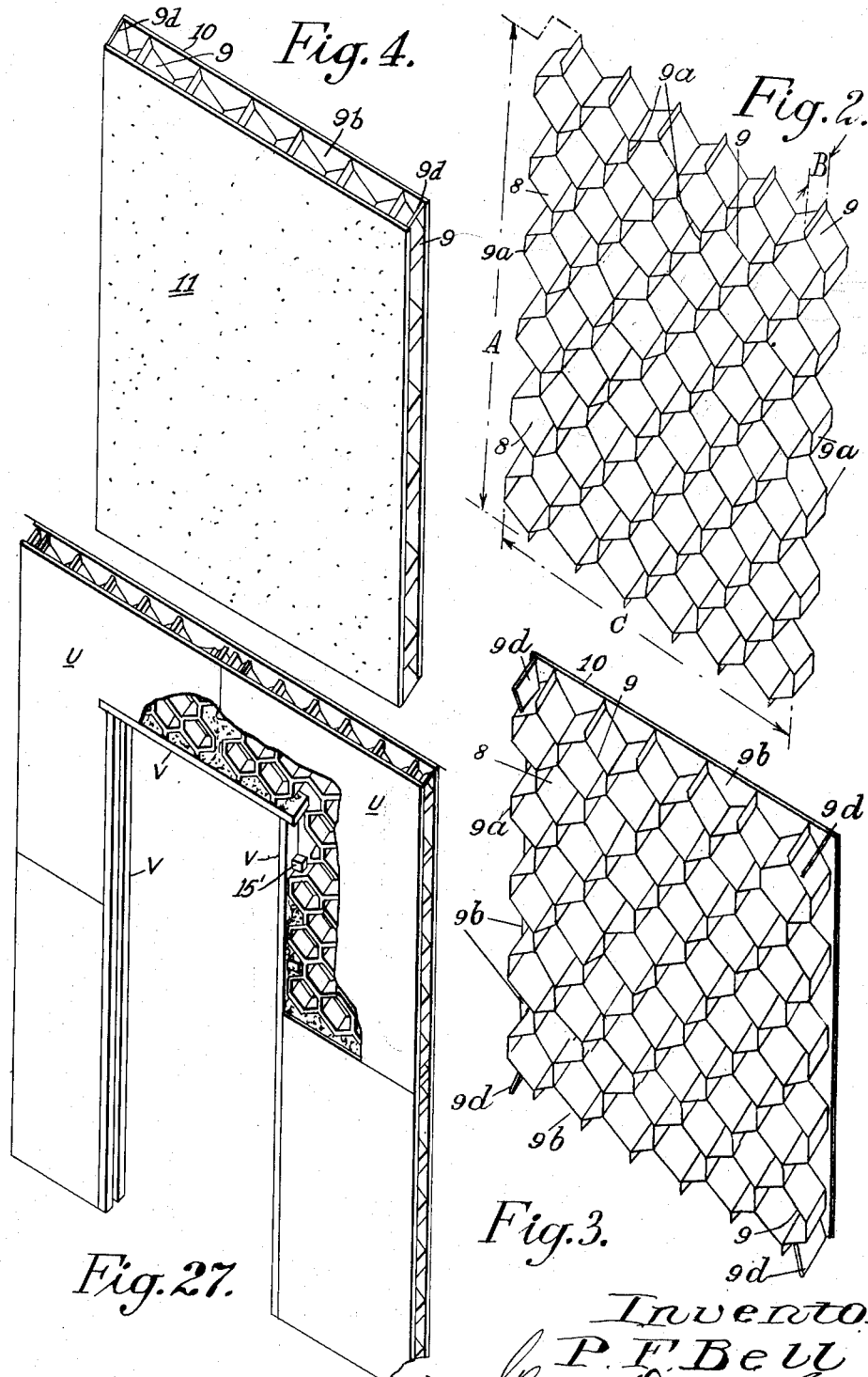

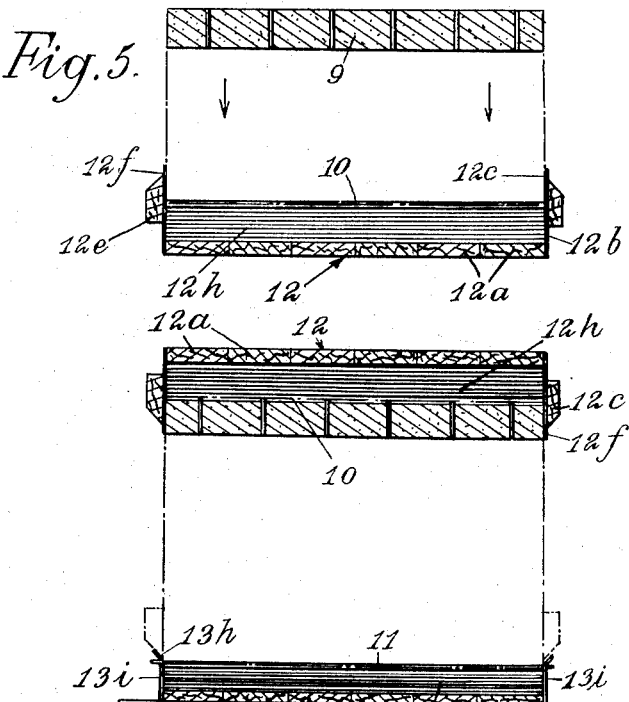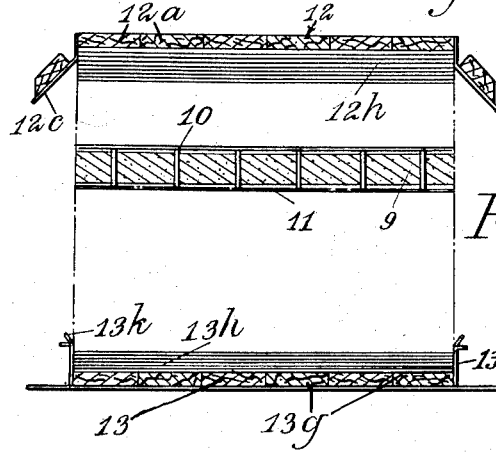

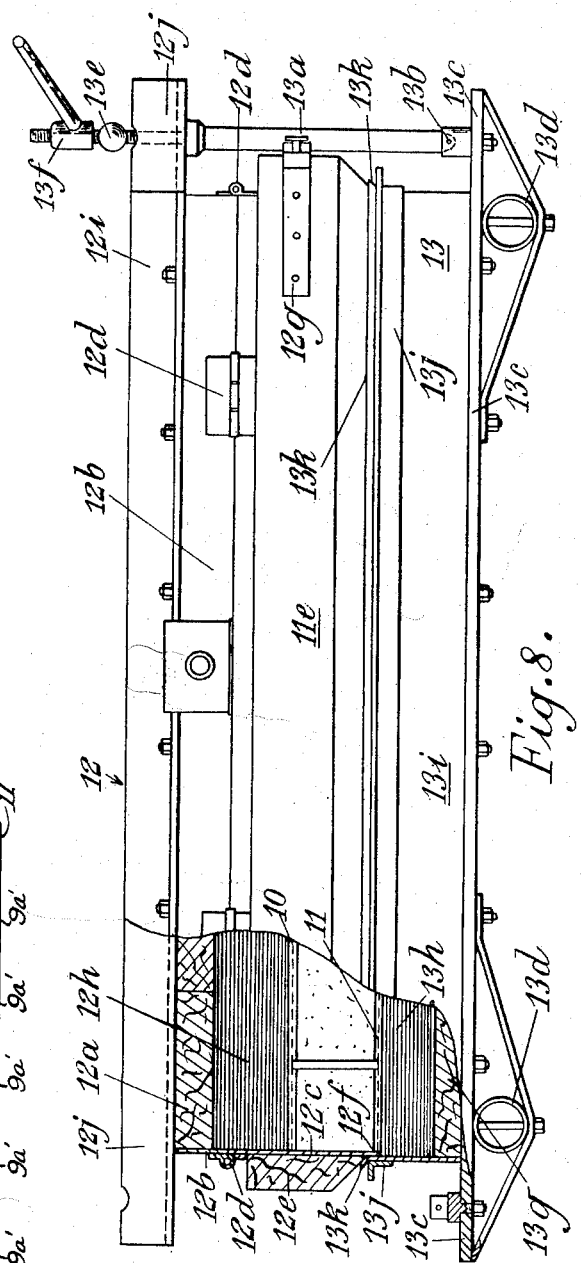

Feb. 23, 1954   P. F. BELL   2,669,860
HOLLOW PLASTER BUILDING PANELS AND METHOD OF MAKING
Filed Jan. 10, 1946   10 Sheets-Sheet 5

Inventor
P. F. Bell
By Glascock Downing Rick
attys

Feb. 23, 1954  P. F. BELL  2,669,860
HOLLOW PLASTER BUILDING PANELS AND METHOD OF MAKING
Filed Jan. 10, 1946  10 Sheets-Sheet 6
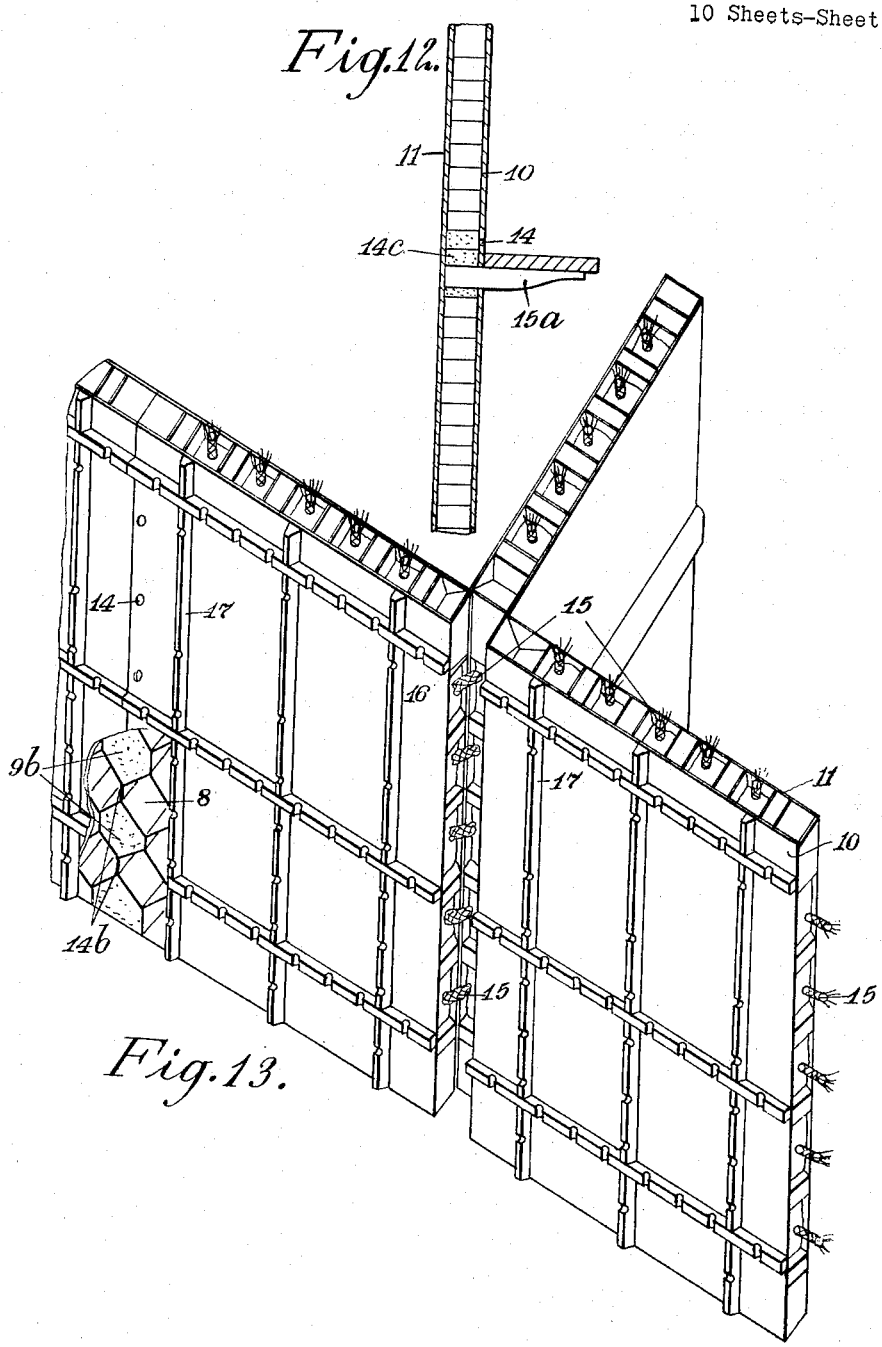
Inventor
P. F. Bell

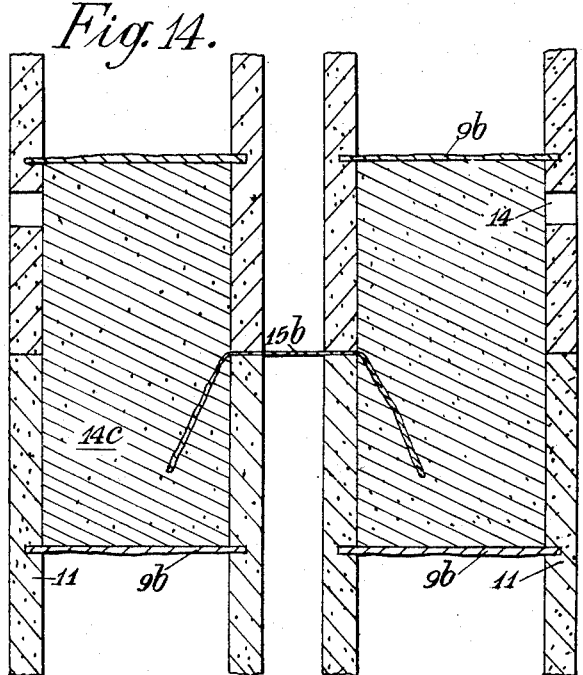
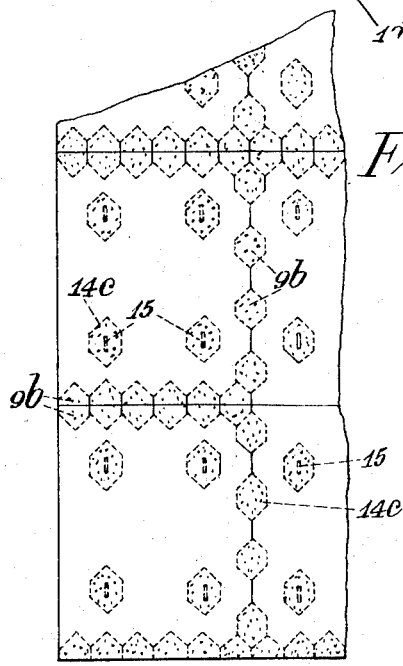
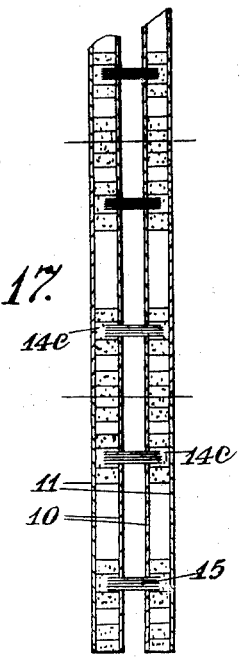

Feb. 23, 1954 P. F. BELL 2,669,860
HOLLOW PLASTER BUILDING PANELS AND METHOD OF MAKING
Filed Jan. 10, 1946 10 Sheets-Sheet 8

Inventor
P. F. Bell

Feb. 23, 1954 P. F. BELL 2,669,860
HOLLOW PLASTER BUILDING PANELS AND METHOD OF MAKING
Filed Jan. 10, 1946 10 Sheets-Sheet 9
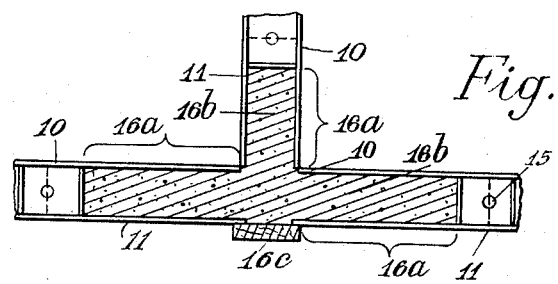
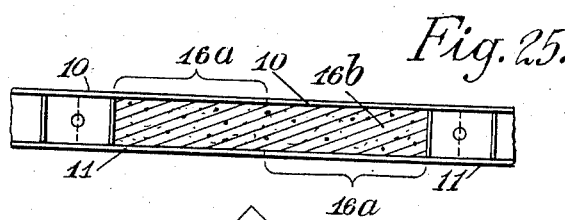
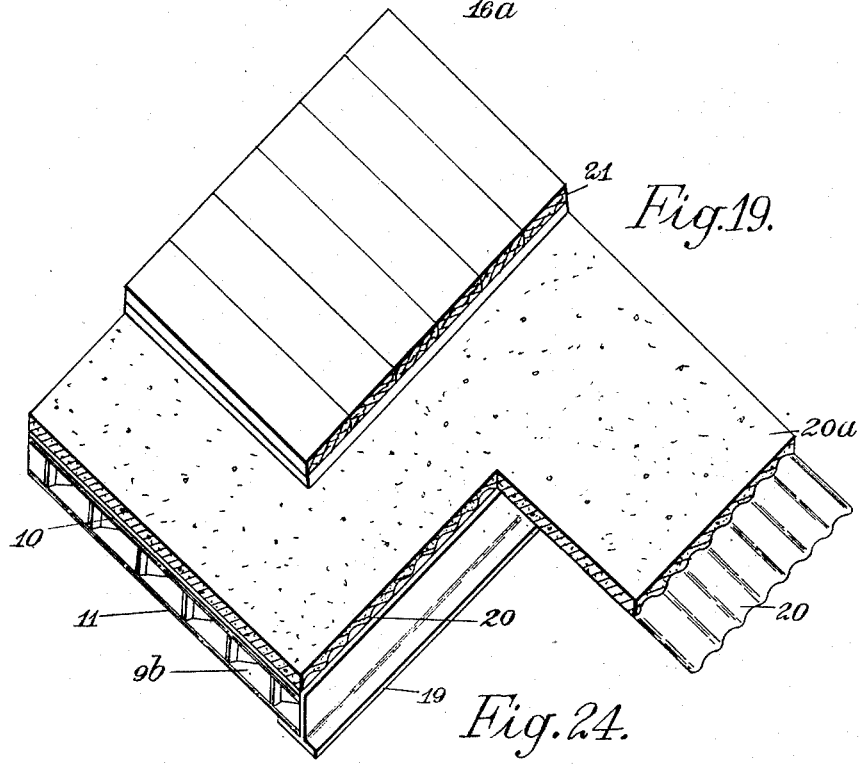
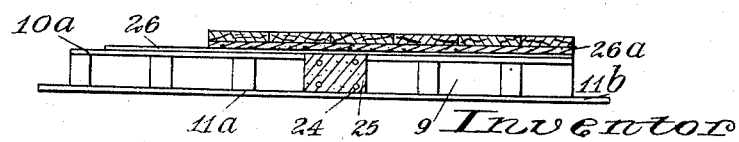
Inventor
P. F. Bell Feb. 23, 1954 P. F. BELL 2,669,860
HOLLOW PLASTER BUILDING PANELS AND METHOD OF MAKING
Filed Jan. 10, 1946 10 Sheets-Sheet 10
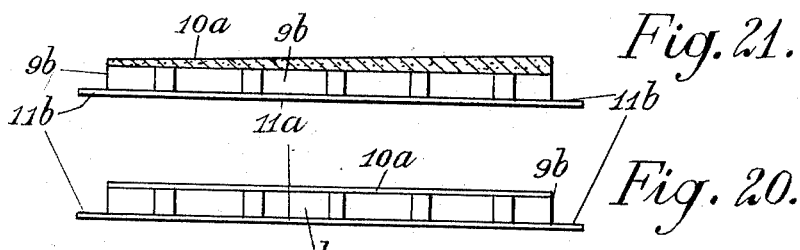
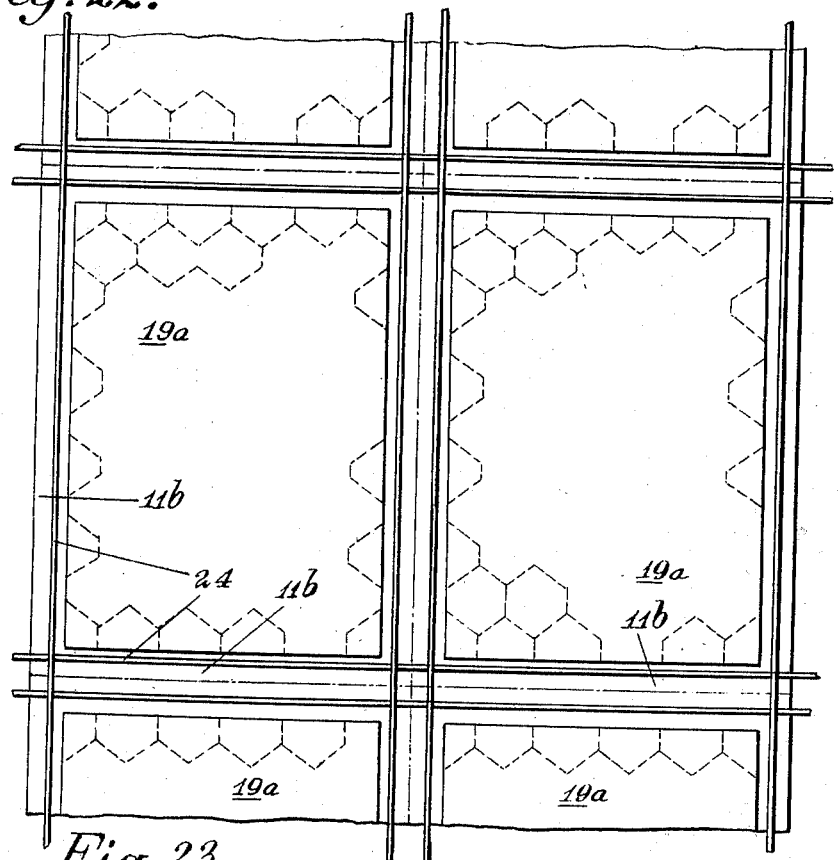
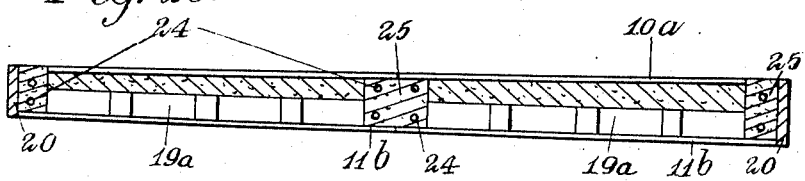

Patented Feb. 23, 1954

2,669,860

UNITED STATES PATENT OFFICE 2,669,860

HOLLOW PLASTER BUILDING PANELS AND METHOD OF MAKING

Percy Fred Bell, Walton-on-Thames, England, assignor of one-third to Norman Greenlees Weir Loudon and one-third to Sound City (Films) Limited, both of Shepperton, Middlesex, England Application January 10, 1946, Serial No. 640,192

Claims priority, application Great Britain January 31, 1945

14 Claims. (Cl. 72—16)

This invention relates to the manufacture of building panels or units and to building constructions for dwelling houses or other buildings.

Present-day requirements and conditions brought about by the war have created very difficult housing problems both with regard to labor and materials.

In addition to its general application the present invention is directed towards a solution of these problems while allowing freedom of design or layout and great latitude in respect to accommodation. Therefore, an aim of the invention is to provide building panels, slabs or units, hereinafter referred to as units, in which metal and wood are rendered unnecessary, being in the main made of inexpensive materials generally available and which are capable of both factory manufacture or prefabrication and speedy erection in various building constructions, by the use of unskilled or partially skilled labor.

The invention also affords the advantages among others: of providing for heat and sound insulation, ease and adaptability in jointings, and facility for introducing and accommodating electric wiring and certain service piping. Further advantages of the invention will hereinafter appear.

Therefore, while this invention relates broadly to the art of building constructions, it specifically relates to a pre-formed monolithic building panel or unit and a method of making such panel or unit.

Therefore, the invention has for an object providing a pre-formed monolithic building panel that comprises spaced facing sheets composed of a moldable material such as gypsum plaster into which can be embedded a layer of scrim that extends over the area of each facing sheet and between the facing sheets and spacing them about a monolithic core structure that is integral throughout composed of a series of rows of similarly undulated superposed partitions of scrim and plaster, usually gypsum plaster. The series of rows of partitions are integrally interconnected at spaced areas along the lengths of each partition to form walls that define cells. The axes of the cells lie parallel to one another and transversely of the plane of the facing sheets and the open ends and adjacent wall portions of the cells are embedded to a substantial extent in an integrally united tube with plaster of the facing sheets so that the core and sheets mutually reinforce one another with the cell ends being covered by the sheets.

It is a further object to provide a method of making the aforementioned building panel or unit.

According to the invention monolithic building units are provided comprising: parallel surface forming areas, hereinafter called facings, and a cellular core with cell walls integrally united to the facings, both the facings and the core being formed of casting gypsum or like plaster or any suitable moldable non-metal cement or material, hereinafter called plaster, preferably incorporating a fabric or other reinforcement which may be that known as scrim.

The invention comprises a unit as set forth in the preceding paragraph wherein the cell walls are transverse to the facings.

Under the term "plaster" the use of Portland or other relatively slow setting cement is not excluded but it will be appreciated this would add to the weight of the units and that the invention is employed to the best advantage with the use of a quick setting casting plaster. Adequate reinforcement of the plaster is secured for normal purposes by the use of jute scrim, sisal, or other open net material, or felted sheet material, made from natural or synthetic fibres, but where metal is available, wire fabric or open woven fine wire is suitable for the reinforcement. For convenience hereinafter the incorporated reinforcement will be referred to as scrim.

The invention also comprises a building unit as set forth above wherein the cellular core is kindred to the well known honeycomb form, the cells being hexagonal but preferably having a pair of opposite walls shorter than the others, and wherein the axes of the cells are at right-angles to the facings and the ends of the cell walls are embedded therein.

The invention also consists in a method of manufacturing units of the character indicated above including two steps: firstly, molding the core in cell axial extent according to the thickness of the building units, or in multiples thereof, and subsequently sub-dividing to the desired core thickness, and secondly, inserting a cellular core endwise of the cells in a facing layer of plastic plaster incorporating scrim on a mold platform so that the ends of the cells are integrally embedded in the facing plaster and then inverting the core and attached facing upon a similar facing layer of plaster incorporating scrim to integrally embed the other ends of the cells in the other facing.

The above method step first mentioned above preferably comprises applying by brushing, spreading or spattering liquid plaster upon a web of scrim to form a relatively thin layer incorporating the scrim, supported on a series of ridge and trough molds to form one half of the cell shape of a row of cells, and then erecting collapsible ridge forms, which may be formed of a pair of leaves hinged together longitudinally, over the first troughs to form a second row of ridges and troughs, the base of the latter being the apex of the ridges below. Another web of scrim is laid and supported on the second ridge and trough form and plastered as before to mold the other half of the cells of the row. The work proceeds with repetitive molding to complete the extent of the core structure desired by erecting collapsible ridge forms successively over the troughs row by row as the cells are integrally built up and withdrawing the collapsed forms axially when the plaster has set.

Thus, and consistent with the foregoing, this invention has for an object to provide a unique method of making a building unit in which the molding of adjacent webs of scrim and plaster by interconnecting the bottoms of the troughs of the second web to the tops of the ridges of the first web provides a course of cells between the webs and the repetitive molding of similar webs in successive super-imposition forms plural interconnected courses of cells constituting a core.

The number of superposed cells depends upon the predetermined width of the building units or the number of cell units to be assembled or fitted together to form a core and be molded into the plaster facings.

The edges of faced core units expose half or fragments of the cell cavities and these are utilised in connecting or jointing units together either in direct line edge towards edge or at an angle to one another for corners, T or cross junctions, or for attaching framing or other structures to the units, or the latter to structural work and the like.

The invention further consists in a method of jointing for use in connection with cellular or cavitied building units comprising: forming small holes or bores through the surface or facings of a unit adjacent a joint to be made and pouring or injecting liquid or semi-liquid plaster through said holes to fill the adjoining cavities and clearances so that the introduced plaster forms uniting keys. The method may also include reinforcing the joint by the previous insertion into or across the cavities of tie members, chicken wire dollies or dowels, hereinafter called "dowels," so that such become embedded in the jointing of plaster.

The cellular structure of the cores of the improved building units may be left empty or they may be filled, either at the factory or on the site with appropriate foamed or comminuted or fibrous sound or heat insulating material.

To increase the load carrying capacity of building constructions employing the improved units concrete, reinforced or otherwise, may be poured or molded at the edges of units or at corner junctions or between the edges of units, the exposed half cell cavities of the units serving as accommodation for the poured or molded concrete. These exposed half cell cavities may be cut and folded back to provide a larger cavity, while the adjacent facings or part thereof provide self-contained shuttering for the molding operation. Alternatively the cavities referred to above may be employed as housings for load bearing stanchions or beams.

Units formed in the manner of the invention, that is, by embedding cells in opposite faces, have a proven load bearing capacity far exceeding that of the load carrying capacity of the plaster face members alone without the reinforcement of the cells adhered in the manner designed by this invention.

The method of pouring or injecting solid joints and the means of forming or molding picture rails, skirting boards and the like directly on the faces of the units, and the method of fixing doors, framing and other fittings by injection, leaves the whole building without cracks which vermin or termites can inhabit.

By means of injecting or pouring the solid jointing described in this invention, and introducing reinforcement where necessary, the structure erected by this means is in the whole composed of a grid system of continuous solid stanchions and beams, making the structure monolithic and greatly in excess of the total strength of individual units. This monolithic structure can in itself carry roof weights and exterior cladding can be hung on it as required to provide cavity walling if desired.

The scrim reinforcement is used throughout the entire formation of the unit both in honeycomb and faces for the purpose of sustaining and reinforcing against any shocks during transit, manufacture or erection, at the same time holding any damaged edges together. This reinforcement greatly lessens the possibility of fracture, but where fracture occurs it is localized to the extent of the cell sides embedded in the faces.

In the accompanying drawings:

Figure 1 is a fragmentary isometric view showing a molding means for manufacturing cellular cores according to one form of the invention and illustrating parts of a molded core in position.

Figure 2 is a diagrammatic isometric view of a core unit such as produced by the molding means as shown in Figure 1, cut or formed in thickness, dimension B of Figure 1, to suit the building unit for which it is intended.

Figure 3 is a similar view illustrating the application of one facing to the ends of the cells of the core shown in Figure 2.

Figure 4 is an isometric view showing the addition of the other facing to the faced core unit illustrated in Figure 3 to complete the building unit.

Figures 5, 6 and 7 are diagrammatic sectional views illustrating the molding means for molding facings to the ends of the cells of the core unit as shown in Figures 2, 3 and 4, Figure 5 showing the molding means with the core unit about to be positioned for molding the first facing, and Figure 6 showing the mold and faced core illustrated in Figure 5 inverted and ready to be positioned upon the lower molding means to mold the second facing, while Figure 7 illustrates the final molding stage with the molding means separated to release the core faced on both sides.

Figure 8 is a side elevation, partly in section, of the upper and lower molding means in the position for molding the second facing of the core.

Figure 9:
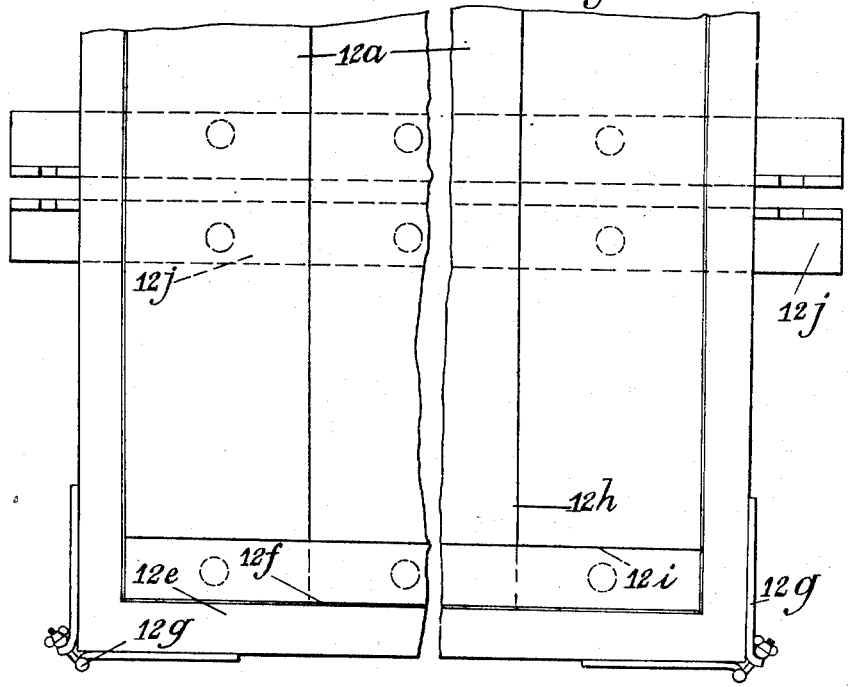

Figure 9 is a fragmentary plan view of the upper mold or mold as shown in Figure 8 and diagrammatically in Figure 5.

Figure 10:
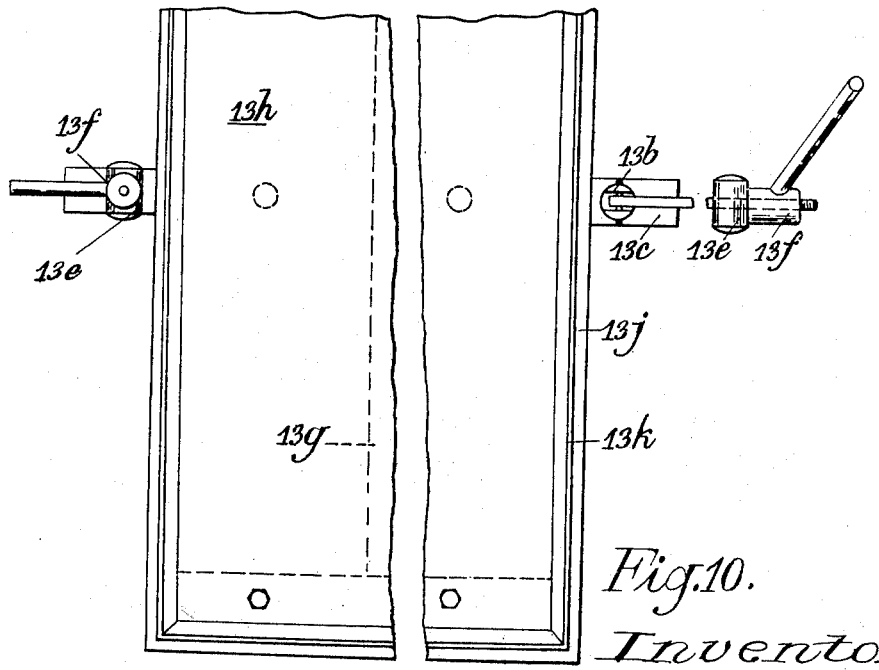

Figure 10 is a fragmentary plan view of the lower mold shown in Figure 8 and diagrammatically in Figure 7.

Figure 11 is a diagrammatic sectional view showing the jointing of two units together by injecting plaster by means of a flexible bag.

Figure 12 is a diagrammatic sectional view showing the insertion and injection jointing of shelf-supporting batten means in a cellular unit according to the invention.

Figure 13 is an isometric view of a portion of walling formed of building units according to the invention arranged at a T-junction and illustrating a vertical cavity at the joint for the molding of a plaster or concrete column.

Figure 14 is a sectional fragmentary view of the horizontal jointing of units for forming a double or cavity wall by the injection method according to the invention and illustrating wire reinforcement.

Figure 15 is a diagrammatic isometric view illustrating units for a double or cavity wall as shown in Figure 14.

Figure 16:
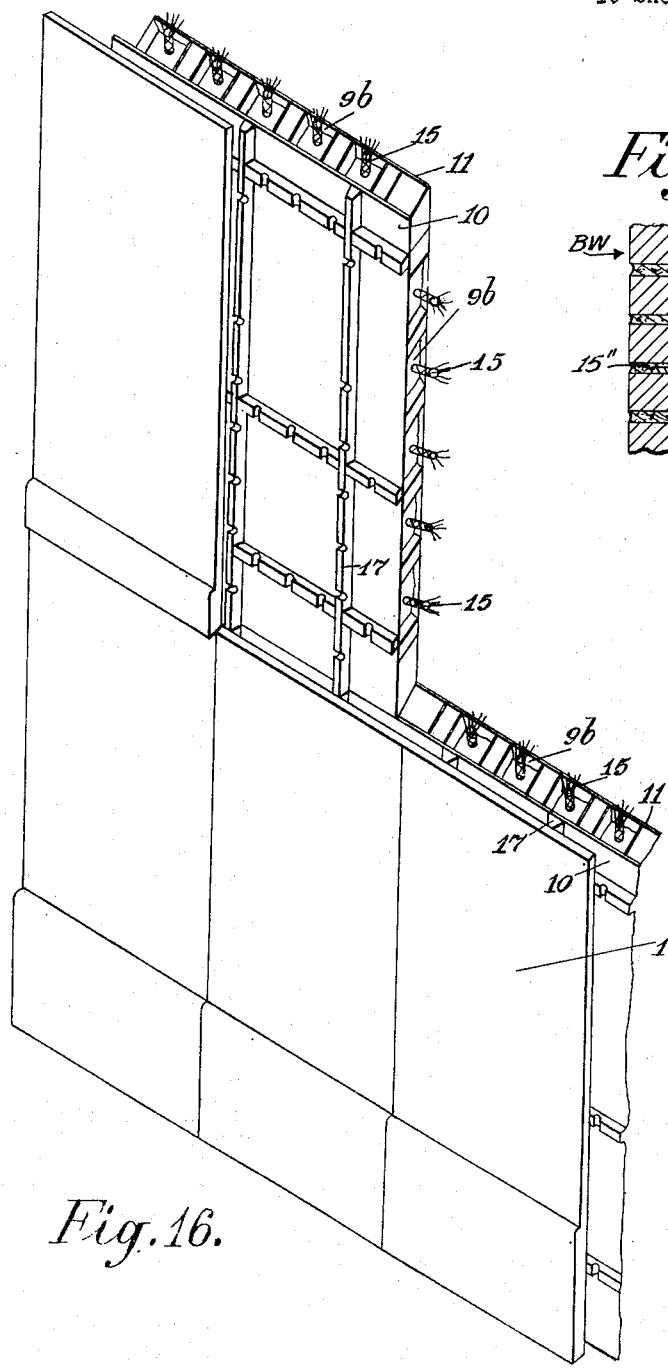

Figure 16 is a fragmentary isometric view showing the application of any suitable form of slabs or other exterior cladding applied to walling formed of building units according to the invention and spaced therefrom by ribs formed on the building units to provide further cavitied spaces.

Figure 17 is a fragmentary sectional view and Figure 18 a front elevation illustrating the formation of a double or cavity wall secured together by ties or dollies embedded in plaster in certain cells introduced by the injection method and showing in dotted outline only those cells filled with plaster.

Figure 19 is an isometric fragmentary view illustrating the formation of a floor and ceiling by the use of units according to the invention.

Figure 20 is a side elevation of a roof, floor or ceiling forming unit having a marginal rebate for the channel molding of concrete reinforcement according to the invention.

Figure 21 is a similar view of a rebated unit having one facing molded with an inclined exterior surface for providing drainage when the unit is used for so-called flat roofing purposes.

Figure 22 is a fragmentary plan view showing rebated units in position (according to Figures 20 and 21) to form channels for the reinforced concrete beams or the like between units for forming a flat roofing or a flooring or flooring with finished ceiling.

Figure 23 is a cross section of roofing according to the arrangement shown in Figure 22 with shuttering for molding beams in the external rebates in position.

Figure 24 is an end view, partly in section, illustrating rebated units with a molded concrete beam when employed for ceiling and floor forming purposes.

Figure 25 is a fragmentary plan of the junction of aligned walling units illustrating the casting of a load bearing concrete column or stanchion between the units, employing a portion of the unit facings as shuttering.

Figure 26 is a fragmentary plan illustrating a similar method of introducing a load bearing vertical member of concrete at a T junction of walling units.

Figure 27 is a fragmentary isometric view illustrating an assembly of panels modified to provide for a door frame.

Figure 28:
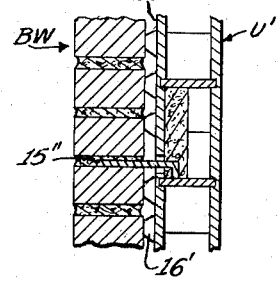

Figure 28 is a fragmentary sectional view showing a wall structure combining panels of the invention with standard brick walling as an outer shell, and Figure 29 illustrates in side elevation a modified form of panel in which the cell axes of the molded core extend obliquely to the planes of the respective facing sheets.

In carrying the invention into effect according to one mode as described, by way of example, as applied to the production of a standard building unit, molding means are made for forming a hexagonal cellular core and platform molds constructed for producing the facings.

Suitable dimensions chosen for the units according to the present example are as follows: length 4 ft., width 3 ft. and thickness 4 inches, the facings being about ½ to ⅝ inch thick. For a 4 inch thick unit the core thickness may be 3½ or 3⅝ inches and the core is composed of a regular series of uniform cells, the number, in the form exemplified in the drawings, being of the order of 60 complete cells with half cells at the margins, while in other forms there may be as few as 28 complete cells per sq. yard or a square yard may suitably comprise 45 complete cells.

The core molding means may be formed in wood or metal or other suitable material fixed on mounting boarding or a base 2 and comprise a series of ridges 1, Figure 1, of inverted V form with flat apices which are arranged parallel and spaced apart to form corresponding troughs or valleys 1a, the sectional contour of the ridge and trough form being that of one half of the cells of a row. The floor 1b of a trough is flat and corresponds in width with that chosen for one of the shorter sides of the hexagonal shape. The series of troughs and ridges may extend for any suitable length on the dimension marked A but it may be convenient to form such in lengths corresponding with the height or length of a building unit or a multiple thereof, the longer lengths being readily cut into the standard height or lengths for the molded units. The lengths or axial extent, shown as dimension B, Figure 1, of the ridges and troughs again may conveniently be multiples of the thickness of the cellular core which it is intended to embody between facings, as the cellular structure when molded may be cut at right-angles to the cell axes and the troughs and ridges into suitable core thickness.

Assuming dimension A is for the length of units, dimension C corresponds with the width thereof, but these dimensions may be reversed, that is, dimension A may correspond with unit widths and dimension C with unit lengths.

At each end of each trough, a loose closure piece 3 is erected which corresponds with the shape of the contour of a trough and extends upwardly to an apex 3a at an angle corresponding with the other half of the cell shape. For convenience in manipulating the closure pieces they may have finger holes 3b. These end closure pieces 3 have slightly above their widest dimension a pair of small ledge plates 3c inserted in their edges and provided to form footings for hinged ridge forms 4 adapted to be located for the commencement of a second and subsequent rows of cells. The hinged forms comprise a pair of leaves hinged together along one edge as at 4a, to provide collapsible ridge-forming members, and may be of wood or metal, the hinge piece being conveniently of cloth where the forms are of wood, and when wood is employed it is preferable to provide them with a covering of American cloth or other protective layer which will prevent sticking of the plaster. In the region of the hinge the leaves are formed so that when in the erected position their upper edges 4b lie flat and are adapted to provide the bottom of the troughs for the next succeeding row of cells to form the shorter cell walls parallel with those of the trough floors 1b of the first-mentioned or base mold form. A series of battens 5 are provided for the molding trough as referred to below, one of which is seen in Figure 1 in position in a trough for molding an upper row of cells.

In operation, a web of open mesh scrim 6 is laid over the ridges and in the valleys or trough 1a of the base mold form, the scrim being held down on the floor 1b of the troughs by loose battens 5. The end pieces 3 are placed in position to close the ends of the troughs and in the first step these end pieces serve simply to confine the plaster laterally in the molding operation. Plaster such as that known in the trade as fibrous or casting plaster, is applied in the form of a paste by spreading, spattering or brushing it on to the scrim throughout the length and breadth of the mold form. The plastered scrim length forms a corrugated length which forms the lower half of the first row of cells. After the plaster 7 has set or while in a moist condition, which impregnates and keys in with the scrim mesh, the battens 5 are removed from the troughs and the collapsible hinged forms 4 are erected on the footings 3c on the end pieces 3 which remain in position in the troughs 1a for forming the molding ridge and troughs for forming the upper half of the cells. The trough ends between the collapsible ridge forms 4 are filled by introducing another set of end pieces 3 similar to those already described for the base form. The erection of these hinged ridge forms provides a ridge and trough contour similar to that of the base mold form and a web of scrim 6a is laid over these ridges and in the troughs between them, being held down in the troughs by repositioning the battens 5 referred to above. Plaster 7a is applied on to the scrim 6a which it penetrates and unites with the plaster 7 of the lower half of the cells to complete the hexagonal form of the first row of cells and form an integral cell structure. Molding proceeds subsequently for the formation of tiers of rows of cells, additional sets of end pieces 3 and hinge forms 4 being positioned for molding row by row after the manner seen in Figure 1 with the laying of scrim and plastering stage by stage to form the lower and upper halves of the cells in succession, leaving all the end pieces and hinge forms in position until the required height of cell structure has been built up to correspond with the width of panel or slab unit to be produced, when all the end pieces are withdrawn and the hinge forms extracted endwise after collapsing by folding them, in the same operational step.

When the cellular core formed in the above manner is properly set it is cut into the required lengths for the units midway through the cells and removed from the base mold form, which supports it, and cut at right-angles to the axes of the cells on a band saw according to the thickness predetermined for the standard building unit. Figure 2 shows a completed cellular core for a predetermined standard unit as removed after the molding and cutting process described above. The length and width of the core are shown by dimensions A and C and the axial cell length or core thickness is indicated by the dimension B and may suitably be about 3½ inches in the present instance while for thicker finished units this dimension is correspondingly increased. The cell cavities and cell walls are denoted respectively by the references 8 and 9, the reference 9a being applied to the shorter walls.

These cut sections are next molded on each side with facing. In Figure 3 the core, as in Figure 1, is first molded with the facing 10 on one side and then has the facing 11 molded to the opposite side upon the end of the cells, Figure 4.

This operation is carried out on platform molds as referred to above. The platforms of these molds may have a perfectly plain surface when the surface of the facing of the unit is to be of that character, or they may be recessed or provided with ridge moldings to produce corresponding molded forms on the exterior surfaces of the units, such as for example to form skirtings, picture or dado rails, panelling or tiling.

The facings molding operation is diagrammatically indicated in stages in Figures 5, 6 and 7, and the platform molds are formed in two parts, one part 12 being used for molding the facing 10, see Figure 3, and the other part 13 being used for adding the other facing 11, Figure 4, by inverting the mold 12, with its facing and core in position, upon the mold 13.

The mold 12, seen inverted in Figure 8 and in half plan in Figure 9, comprises a board or like base 12a surrounded by a peripheral metal framing 12b, the interior of which corresponds with dimensions of the unit to be faced. Each side of the framing has a hinged plate 12c, the hinges of which are seen at 12d, which may be backed with a wooden piece 12e leaving a projecting edge 12f. The corners of the pieces 12e may be mitred and secured together by a corner clamping device 12g, see Figure 9. To provide for the molding of units of different thicknesses of core the base 12a and frame 12b are adapted to receive adjustable packing pieces or lamination 12h and upon the uppermost layer a molding platform of any suitable surface material is mounted for the reception of a layer of plaster for forming a facing for the core. The boarding 12a is secured at opposite ends to angle irons 12i and to two pairs of angle irons or the like 12j, the ends of which are extended beyond the frame and notched for the reception of closing clamping means consisting of rods 13a hinged at 13b to the base bars 13c for the other mold 13 which may be fixed to tubes 13d or the like mounted on a bench or other support, see Figure 8. The rods 13a are screwthreaded and receive apertured loose shoes 13e adapted to fit in the notches in the end of the angle irons 12j, a handled nut 13f being employed to bring clamping pressure to bear.

The mold 13 has a board base 13g on which adjustable laminations 13h are built up. The mold is surrounded by plate framing 13i bound by angle irons 13j. The plate framing 13i has a lip 13k bevelled outwardly to receive the edge 12f of the first or upper mold.

The working face or platform surface of both molds is made of or has a coating of smooth material impervious to plaster and, as indicated above, this surface may be plain or it may have molding formations for decorative purposes, or recesses for the molding of ribs or bars on the facings of the units.

The platform mold is suitably positioned horizontally as seen in Figure 5 and the platform surface, packed to the desired height, is covered with a layer of plaster to a sufficient thickness or depth, such as ⅝ of an inch for example, to provide the thickness of facing 10, see Figure 3, required for the finished building unit. The plaster for facing is of the same kind as used for the cellular core and may incorporate any suitable pigment to give the desired color finish and may also have mixed in with it an insecticide such as dichlor - diphenyl - trichlorethane. While this plaster is still fluid a sheet or layer of scrim is superimposed to become incorporated as a reinforcement, or the plaster may be laid in two layers with the scrim between. The cut section of cellular core 9, with dimension C of about 3⅝ inches, is laid down and impressed into the plaster 10 to a predetermined depth by a suitable straight edge with rebated ends which determine the depth of impression, so that the ends of the cell walls stand thereon and become embedded in the layer of plaster, causing the cells to be integrally united with the plaster which forms one facing for the core unit. When set, the mold 12 with the core and the adhering facing 10 is lifted up, inverted, see Figure 6, and brought down into the position shown in dotted lines, upon the mold 13 which has been previously spread with a plaster layer 11 reinforced with scrim in a similar manner to that described above in connection with the mold 12, for forming the facing 11, see Figure 4. The edge 12f of the mold is fitted into the lip 13k and rests upon the packed up platform face of the mold 13, which is plain or decoratively or otherwise formed in relief or intaglio. The clamping rods 13a are swung into position with the shoes 13e fitted to the notches in the ends of the angle irons 12j. The handled nut 13f is screwed down, pressing the ends of the cell walling of the core into the layer 11 to ensure the formation of the facing integrally on the core. After completion of the facing molding the combined mold is opened and the sides 12c of the upper mold 12 hinged outwardly to release the core 9 and the upper mold taken away, see exploded view Figure 7.

Mechanical aids may be provided for: raising the mold 12 from the position shown in Figure 5; inverting it and fitting it upon the mold 13, Figures 6 and 8, and for again raising the mold 12 or lowering the mold 13 to liberate the faced core, Figure 7.

This completes the operation for forming a standard unit, and such is lifted off, when it will be appreciated that the facings 10 and 11 are united over the whole of their extent by the cells forming a strong core, which lies with the cell axes at right-angles to the planes of the facings. The extent to which the cell ends are embedded in the facing plaster is such as to secure a monolithic union while the cell structure does not appear on either facing when dry.

At the margins of a unit, it will be perceived that cavities 9b, corresponding with half cells, are exposed at the sides and ends of the unit.

It will be observed that the honeycomb cellular construction described, Figure 2, leaves pockets at the four corners so that the corresponding corner areas of the facings 10 and 11 are unsupported. With a view to affording these corner areas support a piece of plastered scrim 9d may be cemented to each of the adjacent core walls 9 when the molding is in the stage shown in Figure 3, that is to say, when the core is inserted in the facing layer 10 in the mold 12.

For jointing or uniting one unit to another edgewise, a series of small holes 14 are bored in a facing such as 10, Figures 11 and 13, adjacent the junction line so as to penetrate the adjacent half cell cavities 9b, and these bores constitute filling holes through which jointing plaster may be poured or injected through a pressure canvas or other flexible bag 14a with a nozzle or through a hose under pressure, the plaster as it issues through the bores 14 in turn flowing down to fill adjacent joint clearances 14b and cell cavities 8, as seen at 14c, Figure 11, where the plaster is filling up a cavity. The poured plaster forms a solid vertical joint between units. The pouring holes may be subsequently filled and the filling plaster smoothed off, see for example Figure 14. Horizontal joints between superposed units are made in the same way, see Figures 14, 15, where units are illustrated for double or cavity walling as referred to later. In each case the plaster filling of the now complete hexagonal cells formed by the half cells, unites with the interior surfaces of the cells and facings and forms strong keys across the joints.

The above method of making joints and keys by injection may also be applied to the location and securing of cantilevers, brackets, picture molding, skirtings, furniture or builders' fixtures, shelves and the like, and to the fixing of wall plugs. In Figure 12 a fragmentary section of a wall composed of units according to the invention is shown with a bracket or cantilever such as for a shelf, fixed in position by the injection method. The facing 10 is cut through to provide an aperture or slot to expose a cell cavity into which the bracket 15a is introduced, a hole, or holes, 14 is bored above the bracket in the plaster 10 and plaster 14b is injected by a bag 14a. The plaster on setting in the cell cavity firmly holds the bracket in position. Where larger holding capacity is required cell walls adjacent the cell cavity penetrated by cutting through the facing may be broken or perforated to allow plaster to flow through.

In a similar manner wall plugs may be introduced through the facing of a unit, or where plugs are required in the edge of a unit as in fixing door frames or windows, the plugs are placed in the appropriate half cell cavity and plaster is filled in by aid of an injection bag or by a trowel, see Figure 27.

In order to reinforce the joints, dowels 15, Figure 17, formed of rolled pieces of chicken wire or the like are inserted in the exposed half-cell cavities of one unit and positioned by partly filling the half cells with plaster, while the protruding ends of the dowels enter the opposite half-cell cavities of the adjoining unit when it is placed in position to become incorporated on both sides of the joint in the jointing plaster during the pouring or injecting operation.

When it is desired to join two units at right-angles to one another for a corner or angle in building construction, two units are placed together with their inner edges adjoining without overlapping, so that an exterior view of the junction presents a vertical right-angled internal corner the size of which corresponds with the thickness of the unit. In certain of the cavities of the exposed edges of the units wads of scrim are plastered in position to hold the units temporarily in correct relation. The corner is completed by applying exterior shuttering to form an elongated vertical cavity, square in plan. The vertical cavity thus provided is filled in stage by stage in convenient building heights, either with a plaster or with a stronger cement mixture should an additional load carrying capacity be desired.

Where a load bearing vertical column is required between two aligned unit wallings, the cell walls of the half cells in the facing edges of the units and certain adjoining complete cell walls are cut back and removed or folded back between the cheeks of the facings 10 and 11 which form self-contained shutterings. The cutting back is carried out to such depth as may be required to contain the load bearing material or member. The cavity 16a, Figure 25, thus formed is then filled with a suitable concrete 16b, metal reinforcement being introduced, where necessary, to form a solid stanchion or column. In the same way, the cavity 16a may be formed to constitute a housing for a metal stanchion or column without concrete filling.

For a junction of one unit with another to form a T-shaped union, in plan, holes are bored or otherwise formed in the area of a facing of the unit which is to form the cross piece of the T in the vertical plane of the joint to be formed, at intervals corresponding with the cavities in the exposed edge of the other unit to be joined or with certain of them. In these holes dowels are plastered with their ends protruding which are subsequently fitted into the opposing cavities of the other unit when such is brought up to the joint position. Pouring holes are previously formed near the edge of the latter unit, which is to form the stem of the T union, and plaster is poured or injected through these holes to fill the cavities and adjacent crevices and incorporate the ends of the dowels in the jointing plaster.

Where units are arranged at a T wall junction as in Figure 13 forming a vertical cavity 16, this may be left empty or be filled with concrete, reinforced or otherwise, or may house a stanchion or post. Alternatively, where it is desired to provide substantial load bearing columns or posts at the T junction the half cells exposed at the edges of the meeting units of the junction and certain of the interior cells may be cut back to the extent required and removed or folded back as in the case of the aligned unit junction referred to above. Figure 13 also illustrates units with ribs 17 molded on one facing of the units to act as distance pieces for positioning panels or other surface area composition boards 18 shown in position in Figure 16 to form an air space between the panelling and the facing of the units.

Figure 26 illustrates in plan a load bearing column molded at a T junction with cell walls cut away to form extended molding cavities 16a between the adjacent portions of the facings 10 and 11 which act as self-contained shuttering. The open portion of the T-shaped cavity is covered by a shuttering board 16c and concrete 16b is poured into the cavity, with or without the introduction of reinforcement. Instead of filling the cavity it may, if desired, be employed as a housing for the accommodation of a T or other stanchion or post.

Units may be erected to form double or cavity walling or partitions, see Figures 14, 15, 17 and 18, which may be employed for party walls or in other suitable situations. In erecting spaced or cavity walling or partitions, the units are assembled and jointed side by side in superimposition and before positioning oppositely facing pairs of units, the adjacent facings, such as 10, Figure 17, are apertured or slotted opposite selected core cells, and dowels 15 of plaster soaked scrim or chicken wire are inserted. For convenience in insertion the scrim or chicken wire may be wrapped around sticks of wood. In the outer facing 11 pouring holes are bored above the dowels and plaster is injected after the manner already described to fill the cell cavities occupied by the dowels which when the plaster 14c is set form securing wall ties. In the elevation, Figure 18, the dowels 15 and plaster filling 14c are shown in selected positions as seen through the outer facing 11. This figure also shows the keys filling the adjacent half-cell cavities 9b at the horizontal and vertical walling joints which are made stage by stage by the injection method as described, preferably with the aid of dowels 15 as seen in Figures 13 and 16. These joints may also be reinforced by wall tying strips of chicken wire 15b as shown, for example, in Figures 14 and 15. The wire 15b is placed across the edges of the adjacent facings 10 and tucked into half-cell cavities 9b and become embedded in the plaster 14c when it is injected through the holes or bores 14.

Although the invention has been heretofore described more particularly with reference to walling units, similar units may be produced for flooring or roofing areas. Flooring units may be supported upon any suitable joists, or alternatively joists may be molded or cast between the units.

A similar arrangement may be adopted for roofs, the rafters or beams being of known character, or rafter members being molded between units. The exterior surface of the roof may be of plaster, concrete or cement mixture, and where plaster is used either for exterior surfaces for roofs or exterior walls any suitable waterproofing material or weatherproofing coat may be applied, either by laying, spraying or brushing.

In Figure 19 is illustrated a suitable mode of applying the invention to flooring. For supporting the flooring and ceiling structure T or other joists or beams are provided, one of which is shown at 19, on one side of the web of which a cellular unit with facings 10 and 11 and exposed half-cells 9b is shown supported by way of example. Units are laid on the joists to afford the desired ceiling area with the joints made by the injection or pouring method described, and in order to utilise the joists and form a floor sheets of corrugated iron 20 are laid on the tops of the joists to cover the units, leaving a cavity between the unit facing and the corrugated sheet. When laid these corrugated sheets are covered with a continuous layer 20a of concrete to a suitable thickness.

On the upper surface of this concrete when set any suitable flooring board, slabbed or other parquet or tread surface material 21 is laid. The under surface of the facing 11 may form the ceiling of the room beneath. The corrugations of the sheets 20 form an air space or continuous cavity and, if desired, this space may be used for wiring or certain service piping.

According to another method applicable to flooring and to roofs, cellular units instead of being molded with the facings of equal area are made with one facing 10a, Figures 20 and 21, of less dimension than the facing 11a by providing suitable positioning means for a smaller mold 12 in the mold 13 to provide a flange or margin extension 11b on the facing 11. The facings 10a and 11a may be made with their outer surfaces parallel or if for roofwork the smaller facing 10a may be molded of progressively decreasing thickness as seen in Figure 21, the inclined surface created thereby being in the direction of drainage.

Units for adjacent positions are molded in graded form to form a continuous unidirectional slope when the units are assembled.

The facing 11a may be three or more inches longer and wider than the facing 10a so that the lateral flanges 11b form marginal rebates and these rebates, when a series of units are laid together edge to edge, form concrete molding channels to provide an integral beam reinforced roof.

In building a roof of prefabricated units such as above described, in situ, a suitable number of iron tubes or other bearers are laid across the walling of the dwelling or building to be roofed, these bearers being intended temporarily to support assembled units while being reinforced in situ with concrete. Upon these bearers four or more units 19a according to the desired area or section of the area it is desired to roof in, are laid in pairs edge to edge, see Figures 22 and 23, in such a manner that their adjoining rebates 11b form a channel of intersecting cruciform character which is adapted to constitute self-contained shuttering for the concrete molding operation. A narrow shuttering 20, Figure 23, corresponding with the overall thickness of the units, is secured around the periphery of the assembly in order to convert the outer rebates into molding channels.

At a suitable stage metal reinforcing rods 24 or joists may be laid in the several channels according to known practice, after which a suitable concrete or like mixture 25 is poured into the shuttered and the cruciform channels with the result that an integral reinforced concrete grid is provided in the form of an outer frame connected by cruciform inner limbs, which are also integral with the panels and keyed thereto by the concrete which enters the exposed cell cavities 9b of the unit cores. The molded concrete may be screeded over to level up with the facings 10a.

By suitable positioning assemblies of panels the whole roofing area may be reinforced together, or the panels may be framed and reinforced with the concrete section by section, adjoining sections being united with adjacent sections by the molded concrete. The whole roof area may be finally covered with roofing felt or other sheet material adhesively secured, or with an asphalt or other waterproofing material.

The invention may be applied to the provision and the erection of flooring, see Figure 24, by assembling units, as shown in Figure 20, and arranging them as described in reference to Figures 22 and 23. On one side the facing 10a may be covered by a layer 26 of reinforced concrete of appropriate thickness on which floor boards or any other suitable known flooring or tread material may be laid with an intervening layer of felt 26a if desired, while on the other side the units expose the facing 11a which may be plain or molded suitably for room ceilings.

Provision for windows and doors may be readily made. Figure 27 illustrates the provision for a door. Where the omission of a standard unit does not provide the required width of opening, units U may be sawn or cut back as shown, or narrower units introduced to adjust the width of opening. With regard to height of opening, while a unit of shorter length may be provided, Figure 27 shows the units U cut and secured in position by jointing with the adjacent units and the door frame members V. It is believed obvious that window openings are similarly framed by the use of head beams and lintels and sills or the like. In each case the exposed half-cell cavities of the adjacent units may be utilised for keying plaster in selected cells with dowels or plugs 15' or other fixtures molded in position.

The cellular structure of the unit cores lends itself to the introduction of electric wiring or the installation of certain piping for services. Wiring may be readily introduced by employing a long rod which may be pointed at one end and have a hook or eye at the other. The rod is used to penetrate the cells laterally from the edge of a unit between the wall areas. After the rod has been passed through a unit or units the cables attached to the rod eye are pulled through into position. In a similar manner, certain piping may be introduced but in this case the pipes themselves may constitute their own penetrating rod as the cell walls are readily puncturable to admit the passage of the pipes.

Walling composed of units according to the invention may be combined with any suitable standard walls or building materials. Figure 28 illustrates, for example, 4-inch brick walling erected for the outer carcass with the improved unit employed for a lining wall. While the unit U' may be in direct contact with the brickwork it is preferably spaced therefrom, as shown by ribs or projections 16' molded on the facing 10, the cellular construction affording virtues similar to those of 11-inch cavity brickwork. Wall ties 15" for the brickwork BW may be readily fixed by accommodating them in the manner already described in reference to the dowels and the injection method. The standard unit may, as hereinbefore indicated, conveniently be 4 inches thick but such may be thinner for partition work or thicker to provide greater heat and sound insulating qualities; similarly the thickness of the facings of the cores may be varied to suit requirements. The improved units may also be employed as cladding for normal reinforced concrete or steel framed buildings or structures.

Although the invention has been described above in reference to a cellular core in which the cell walls or cell axes extend transversely between the facings at right-angles thereto, a similar result may be achieved where the cell walls or their axes extend transversely between the facings but at an angle less than a right-angle. This is shown in Figure 28. For example, in cutting the molded core block, seen in Figure 1, into core thicknesses for core units as seen in Figure 2, such as for building units 4 inches thick, the cuts may be made obliquely instead of in parallel planes at right-angles to the width dimension B of the cells, thereby dividing the block up in parallel planes which lie at say, for instance, 60° or thereabouts across the cell walls and at a corresponding angle to the axes of the cells in the molded block before cutting. This results in the production of the illustrated cell unit U" of a thickness, dimension B, which, as viewed in side elevation, looks as if it had all its cells pushed over obliquely sideways. As shown, the cells and flat portions 9a' extend obliquely with respect to the planes of the facing sheets 10', 11'.

I claim:

1. A preformed monolithic building panel comprising, spaced facing sheets composed of gypsum plaster having an embedded layer of scrim extending over the area of each sheet, a monolithic core integral throughout between said facing sheets and composed of a series of rows of similarly undulated superposed partitions of scrim impregnated and coated with gypsum plaster with the series of rows integrally interconnected at spaced areas along the lengths of each partition and thus forming walls defining cells open at opposite ends, the axes of the cells lying parallel to one another and transversely of the plane of the facing sheets and the otherwise open ends and the adjacent wall portions of the cells being embedded to a substantial extent in and integrally united to the plaster of the respective facing sheets so that the core ties together the facing sheets with the core and sheets mutually reinforcing one another and the cell ends being covered by the sheets.

2. A preformed monolithic building panel as claimed in claim 1 wherein one of the facing sheets extends beyond the other so that in abutting two panels together with the said one sheet of each panel in alignment a molding channel is formed between the panels for receiving plastic reinforcements.

3. A preformed monolithic building panel as claimed in claim 1, wherein the outer surface of one facing sheet is inclined relative to the outer surface of the other facing sheet.

4. A preformed monolithic building panel as claimed in claim 1, wherein said core presents exposed open fragmentary portions of cells at the margins of the facing sheets.

5. A preformed monolithic building panel as claimed in claim 1, wherein the axes of the cells are parallel to one another and disposed in planes that are oblique relative to the spaced planes containing the respective facing sheets.

6. A preformed monolithic building panel comprising facing sheets of gypsum plaster spaced apart by a cellular core of honeycomb pattern the axes of the cells of which lie transversely of the facing sheets, said core being composed of webs of scrim impregnated and coated with gypsum plaster arranged in superposed rows of cell-defining partition walls having opposite edges, each row having alternating transversely extending ridges and troughs, said ridges having flat top surfaces and the troughs having flat bottom surfaces, the tops of the ridges of one row paralleling and integrally united by the plaster to the bottoms of the troughs of the next adjacent row to define the honeycomb pattern and the facing sheets being tied together in their spaced apart relationship by the partition walls, said walls having their opposite edges embedded in and integrally united to the plaster of the facing sheets to an extent that some of the plaster of the facing sheets lies within the cells inwardly of the said edges so that the core and facing sheets mutually reinforce one another.

7. A preformed monolithic building panel as claimed in claim 6, wherein each facing sheet has an embedded layer of scrim extending over the area thereof.

8. A method of making a building unit which comprises, molding a web of scrim and plaster in alternating transverse ridge and trough form, molding a second and similar web of scrim and plaster in alternating transverse ridge and trough form with the bottoms of the troughs thereof integrally united by the plaster during the molding to the tops of the ridges of the first web to provide a course of cells between the webs, similarly molding similar webs in successive superimposition to form plural interconnected courses of cells constituting a core, and molding facing sheets of scrim and plaster across the opposite edges of all the ridges and troughs and axially inwards of said edges to close the ends of said cells and to provide opposite facing sheets for the core integrally united with the core with the opposite edges of the webs embedded in the facing sheets and the facing sheets and core mutually reinforcing one another.

9. A method of making a monolithic building panel composed of facings of gypsum plaster integrally united together in spaced relationship by an intermediate core of scrim and plaster of honeycomb cell form with the cell axes transverse to the facings, comprising forming the cell form core by molding a first web of plaster and scrim in the form of a series of alternating transverse flat topped ridges and flat bottomed troughs, molding a second and similar web of plaster and scrim with the bottoms of the troughs of the second web paralleling and integrally united by the plaster to the tops of the ridges of the first web to provide a course of cells between the webs, similarly molding similar webs in successive superimposition to form plural interconnected courses of cells constituting a core of honeycomb cell form, and molding facing sheet forming plaster across and axially inwards of the opposite side edges of the webs and thereby forming facing sheets spanning the ends of the cells, covering the cell cavities and integrally uniting the core to the plaster facing sheets.

10. A method of making a monolithic building unit of gypsum plaster and scrim comprising laying a scrim member in the form of a series of alternating transverse troughs and ridges, coating such member with gypsum plaster, laying and coating a second and subsequent scrim members similar in form to the first member in superimposition one upon the other with the bottoms of the troughs of one member paralleling and integrally united with the tops of the ridges of the next adjacent member by the plaster coatings during coating, thereby forming an integral cellular core having opposite faces of transversely parallel and open ended cells of honeycomb formation, with the cells being in rows and formed between adjacent coated members, allowing the core to set, applying plaster facing sheets to both faces of the core by first pressing the core axially of the cells into a plastic facing layer of plaster until the edges of the united members at one face of the core are embedded in said facing layer to a substantial extent, allowing the first facing layer to set and form a facing sheet integrally bonded with the one face of the core, inverting the core and facing sheet bonded therewith upon a second plastic facing layer of plaster and similarly embedding the opposite edges of the united members at the other face of the core in the plaster of the second layer to a substantial extent and allowing the second layer to set to form a second facing sheet integrally united with the core.

11. A method of making a building unit which comprises the steps of molding a web of scrim and plaster in alternating transverse ridge and trough form, molding a second and similar web of scrim and plaster in alternating ridge and trough form with the bottoms of the troughs thereof integrally united by the plaster during the molding to the top of the ridges of the first web to provide a course of cells between the webs, similarly molding similar webs in successive superimposition to form plural interconnecting courses of cells constituting the core, cutting the united webs across the ridges and troughs transversely of the cell axes to the required length for the cells, and molding facing sheets of scrim and plaster across the opposite edges of all the ridges and troughs and axially inwards of said edges to close the ends of said cells and to provide opposite facing sheets for the core integrally united with the core with the opposite edges of the webs embedded in the facing sheets to a substantial extent so that the facing sheets and core mutually reinforce one another.

12. A method of making a monolithic building panel composed of facing sheets of gypsum plaster integrally united together in spaced relationship by an intermediate core of scrim and plaster in honeycomb form with the cell axes transverse to the facings, comprising forming the core by molding in succession and superimposition a series of parallelly arranged rows of webs of gypsum plaster and scrim each in the form of a series of alternating transverse ridges having flat converging sides and flat tops and troughs having flat converging sides and flat bottoms with the bottoms of the troughs of each superposed row plastered integrally to the ridges of the row below such that hexagonal cells are formed by the webs between the troughs of one row and the ridges of the next adjacent row, preparing a facing sheet for the panel by supporting a layer of gypsum plaster in a plastic condition, integrally uniting the said core to the said facing sheet by lowering the said core in the direction of the cell axes into the plaster layer to an extent to embed and effect the integral union of the lower edges of the cell forming webs in and with the plaster, preparing a second facing sheet for the other side of the core by supporting a second layer of gypsum plaster in a plastic condition, inverting the core together with the first facing sheet after it has set, lowering the interconnected core and first facing sheet in the direction of the cell axes into the second layer of plastic plaster to an extent to embed, and effect integral union of, the other edges of the cell forming webs in and with the said second facing sheet.

13. A method of making a monolithic building panel composed of facing sheets of gypsum plaster integrally united together in spaced relationship by an intermediate core of scrim and plaster of honeycomb form with the cell axes transverse to the facings, comprising forming the core by molding a first web of plaster and scrim wider than the spacing of the facings and in the form of a series of alternating transverse flat topped ridges and flat bottomed troughs and then molding a second plaster and scrim web similar to the first web and having the bottoms of the troughs parallelling and integrally united by the plaster to the tops of the ridges of the first web to provide a course of cells between the webs, similarly molding similar webs in successive superimposition to form plural interconnected courses of honeycomb cells, cutting the united webs across the ridges and troughs transversely of the cell axes to the required length for the honeycomb cells and molding a facing layer of plaster across and inwardly of both edges of the cut webs to form facing sheets covering the cells at opposite ends to embed and integrally unite the core to the facing sheets.

14. A method as claimed in claim 12, wherein is included the step of embedding a layer of scrim in preparing the plaster for each of the facing sheets.

PERCY FRED BELL.

References Cited in the file of this patent

UNITED STATES PATENTS

| Number | Name | Date |
| --- | --- | --- |
| 1,060,853 | Peirce | May 6, 1913 |
| 1,086,177 | Hultquist | Feb. 3, 1914 |
| 1,107,906 | Crumbaugh | Aug. 18, 1914 |
| 1,265,438 | Dolyak | May 7, 1918 |
| 1,462,663 | Schall | July 24, 1923 |
| 1,477,520 | Pittman | Dec. 11, 1923 |
| 1,524,147 | Murray | Jan. 27, 1925 |
| 1,545,338 | McClelland | July 7, 1925 |
| 1,562,706 | Lake | Nov. 24, 1925 |
| 1,586,603 | Brown | June 1, 1926 |
| 1,597,167 | Pace | Aug. 24, 1926 |
| 1,863,734 | Venzie | June 21, 1932 |
| 2,050,290 | Earley et al. | Aug. 11, 1936 |
| 2,056,563 | Budd et al. | Oct. 6, 1936 |
| 2,065,355 | Twachtman | Dec. 22, 1936 |
| 2,066,964 | Desagnat | Jan. 5, 1937 |
| 2,095,422 | Stencel | Oct. 12, 1937 |
| 2,168,218 | Kirschbraun | Aug. 1, 1939 |
| 2,192,182 | Deutsch | Mar. 5, 1940 |
| 2,218,675 | Fould | Oct. 22, 1940 |
| 2,235,542 | Wenzel | Mar. 18, 1941 |
| 2,241,603 | Kirschbraun | May 13, 1941 |
| 2,266,510 | Pottinger | Dec. 16, 1941 |
| 2,305,684 | Foster | Dec. 22, 1942 |
| 2,477,852 | Bacon | Aug. 2, 1949 |
| 2,498,513 | Cuypers | Feb. 21, 1950 |

FOREIGN PATENTS

| Number | Country | Date |
| --- | --- | --- |
| 259,706 | Great Britain | of 1926 |
| 261,548 | Great Britain | of 1926 |

OTHER REFERENCES

Ser. No. 212,075, Dornier (A. P. C.), published May 11, 1943.